US010358889B2

United States Patent
Akbari

(10) Patent No.: US 10,358,889 B2
(45) Date of Patent: Jul. 23, 2019

(54) ARCHITECTURE AND METHOD FOR FABRICATING REINFORCED PACKER ELEMENTS

(71) Applicant: SCHLUMBERGER TECHNOLOGY CORPORATION, Sugar Land, TX (US)

(72) Inventor: Hossein Akbari, Sugarland, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 15/553,205

(22) PCT Filed: Feb. 24, 2015

(86) PCT No.: PCT/US2015/017273
§ 371 (c)(1),
(2) Date: Aug. 24, 2017

(87) PCT Pub. No.: WO2016/137441
PCT Pub. Date: Sep. 1, 2016

(65) Prior Publication Data
US 2018/0051531 A1    Feb. 22, 2018

(51) Int. Cl.
| | |
|---|---|
| *E21B 33/12* | (2006.01) |
| *E21B 33/00* | (2006.01) |
| *B32B 1/00* | (2006.01) |
| *B32B 5/02* | (2006.01) |
| *B32B 25/10* | (2006.01) |
| *B32B 1/08* | (2006.01) |
| *B32B 3/08* | (2006.01) |
| *B32B 3/28* | (2006.01) |

(52) U.S. Cl.
CPC .......... *E21B 33/1208* (2013.01); *B32B 1/00* (2013.01); *B32B 1/08* (2013.01); *B32B 3/08* (2013.01); *B32B 3/28* (2013.01); *B32B 5/02* (2013.01); *B32B 25/10* (2013.01); *B32B 2250/03* (2013.01); *B32B 2250/40* (2013.01); *B32B 2255/02* (2013.01); *B32B 2255/26* (2013.01); *B32B 2262/02* (2013.01); *B32B 2262/0269* (2013.01); *B32B 2262/103* (2013.01); *B32B 2597/00* (2013.01); *E21B 2033/005* (2013.01)

(58) Field of Classification Search
CPC ................................... E21B 33/1208
See application file for complete search history.

(56) References Cited

U.S. PATENT DOCUMENTS

| | | | |
|---|---|---|---|
| 2,835,329 | A | 5/1958 | True |
| 5,183,108 | A | 2/1993 | Lee, Jr. et al. |
| 5,778,982 | A | 7/1998 | Hauck et al. |
| 2004/0021687 | A1 | 2/2004 | Wobben |
| 2010/0288486 | A1 | 11/2010 | Kutac |

(Continued)

FOREIGN PATENT DOCUMENTS

WO    2011150367 A1    12/2011

*Primary Examiner* — Kristyn A Hall

(57) ABSTRACT

A reinforced elastomeric element for a packer is disclosed. The elastomeric element is formed of a base layer, a reinforcing layer, and a top layer superimposed over the reinforcing layer to create a reinforced elastomeric element. The reinforcing layer can include instrumentation such as cabling or other devices to communicate through the elastomeric element.

18 Claims, 2 Drawing Sheets

(56) References Cited

U.S. PATENT DOCUMENTS

| | | |
|---|---|---|
| 2011/0036597 A1 | 2/2011 | Corre et al. |
| 2011/0061862 A1* | 3/2011 | Loretz ................ E21B 33/1208 166/250.11 |
| 2011/0120733 A1* | 5/2011 | Vaidya .................... C08J 3/245 166/387 |
| 2012/0175135 A1 | 7/2012 | Dyer et al. |

* cited by examiner

ARCHITECTURE AND METHOD FOR FABRICATING REINFORCED PACKER ELEMENTS

BACKGROUND

Hydrocarbon fluids such as oil and natural gas are obtained from a subterranean geologic formation, referred to as a reservoir, by drilling a well that penetrates the hydrocarbon-bearing formation. Once a wellbore is drilled, various forms of well completion components may be installed in order to control and enhance the efficiency of producing the various fluids from the reservoir. One piece of equipment which may be installed is a packer that, when set, provides mechanical support and seals for other downhole tools. Some packers have elastomeric elements that are enlarged to fill the well and provide support.

SUMMARY

According to some embodiments of the present disclosure, an elastomeric element for a packer is disclosed. The elastomeric element includes a base layer made of an elastomeric material and a reinforcing layer having reinforcing fibers. The reinforcing layer is superimposed upon the base layer. The elastomeric element also includes a top layer made of an elastomeric material superimposed upon the reinforcing layer and bonded to the base layer through the reinforcing layer.

In further embodiments, the present disclosure is directed to a method of manufacturing an elastomeric element for a packer. The method includes forming a base layer of elastomeric material, with the base layer having an outer surface. The elastomeric material is deformed under pressure to set the packer in a well. The method also includes disposing a reinforcing layer over a portion of the outer surface of the base layer. The reinforcing layer has higher mechanical strength than the base layer. The method continues by positioning a top layer over the reinforcing layer, and bonding the base layer, reinforcing layer, and top layer together.

In yet other embodiments, the present disclosure is directed to a method of manufacturing a packer including coating a reinforced fabric material with a first elastomeric compound to form a coated reinforced fabric layer, and forming a base layer for an elastomeric packer element of a second elastomeric compound. The first elastomeric compound is configured to bond with the second elastomeric compound. The method also includes shaping the base layer into a cylindrical shape suitable for the packer, mounting the base layer to a mandrel, and wrapping the coated reinforced fabric layer around the base layer such that the reinforced fabric layer bonds with the base layer.

BRIEF DESCRIPTION OF THE DRAWINGS

Certain embodiments of the disclosure will hereafter be described with reference to the accompanying drawings, wherein like reference numerals denote like elements. It should be understood, however, that the accompanying drawings illustrate only the various implementations described herein and are not meant to limit the scope of various technologies described herein. The drawings show and describe various embodiments of the current disclosure.

DETAILED DESCRIPTION

In the following description, numerous details are set forth to provide an understanding of the present disclosure. However, it will be understood by those skilled in the art that the embodiments of the present disclosure may be practiced without these details and that numerous variations or modifications from the described embodiments may be possible.

Figure 1:
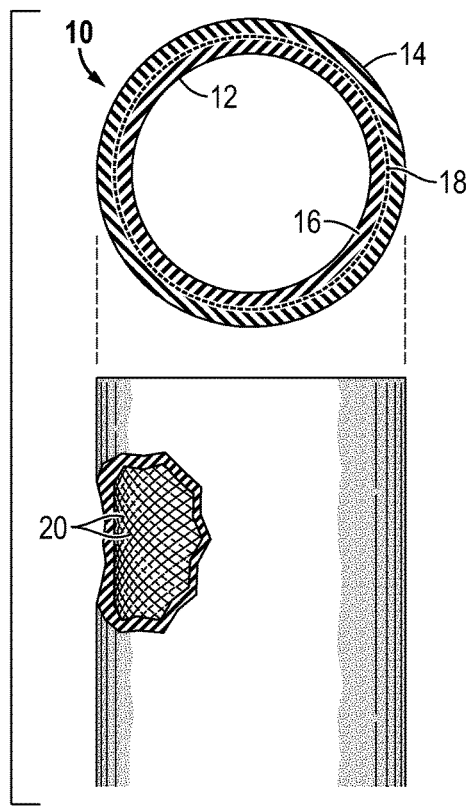
FIG. 1 shows a top and side view of an elastomeric element for a packer according to embodiments of the present disclosure.

FIG. 1 is a top and side view of an elastomeric element 10 for a packer according to embodiments of the present disclosure. The elastomeric element is cylindrical and hollow, having an inner surface 12 and an outer surface 14. The element is made up of a base layer 16 and a reinforcing layer 18. The reinforcing layer 18 is embedded within the base layer 16 and provides additional strength to the element 10. The side view shows embodiments in which the reinforcing layer 18 includes a fabric material having fibers 20 to provide the additional strength. The fibers can be Kevlar, polyamide, steel, or any other suitable material.

When the packer is set, the element 10 expands either under mechanical stress or by swelling forces to engage a casing or the open hole. The elastomeric element 10 anchors the packer to the well and as such experiences differential pressure across the packer after setting. If the pressure is high enough, the elastomeric element can tend to extrude toward the low-pressure side of the packer, potentially compromising seal strength. The reinforcing layer 18 mitigates extrusion by giving the element 10 additional strength.

Figure 2:
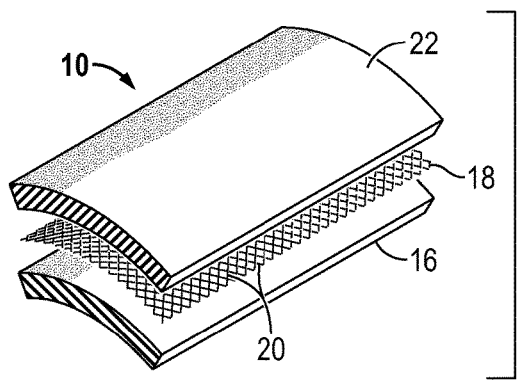
FIG. 2 shows an expanded view of a portion of the elastomeric element according to embodiments of the present disclosure.

FIG. 2 shows an expanded view of a portion of the elastomeric element 10 according to embodiments of the present disclosure. The element 10 can be formed from segments of material such as that depicted in FIG. 2. The base layer 16 is formed, then the reinforcing layer 18 is superimposed on the base layer 16, after which a top layer 22 is superimposed over the reinforcing layer 18. The top layer 22 bonds with the base layer 16 through the fabric, forming a unitary body.

Figure 3:
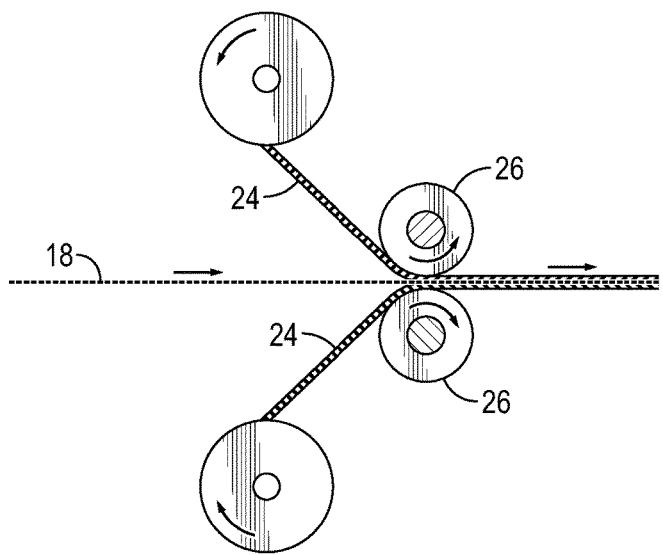
FIG. 3 illustrates a mechanism for calendaring an elastomeric compound onto a reinforced fiber fabric sheet according to embodiments of the present disclosure.

FIG. 3 illustrates a mechanism for calendaring an elastomeric compound onto a reinforced fiber fabric sheet according to embodiments of the present disclosure. The reinforcing layer 18 can be formed of a sheet of material that is fed through a calendaring machine which coats a quantity of elastomeric compound 24 to one or both sides of the reinforcing layer 18 using rollers 26. FIG. 3 shows an embodiment where both sides are coated. The elastomeric compound 24 can be identical to the material from which the base layer 16 (FIGS. 1 and 2) is made, or from another material suitable for bonding to the base layer 16. The base layer 16 can be formed to an appropriate shape such as the cylindrical shape shown in FIG. 1. The coated reinforcing layer can then be wrapped around the base layer 16 to form a "green" element ready for final curing. The combination of reinforcing layer and base layer provides an elastomeric element having a higher strength and resistance to extrusion and other potentially damaging conditions in the well, without sacrificing the element's ability to expand to set.

Figure 4A:
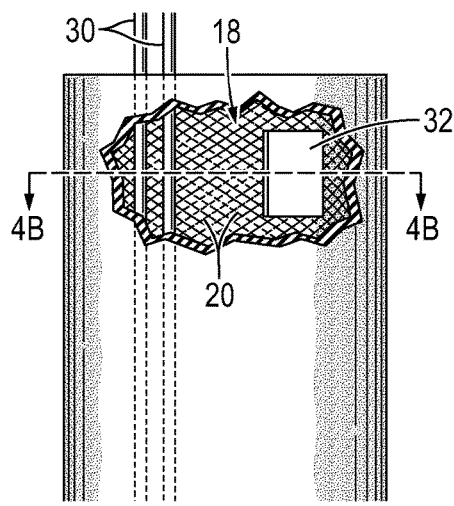
FIG. 4A shows an embedded reinforcing layer according to embodiments of the present disclosure.
Figure 4B:
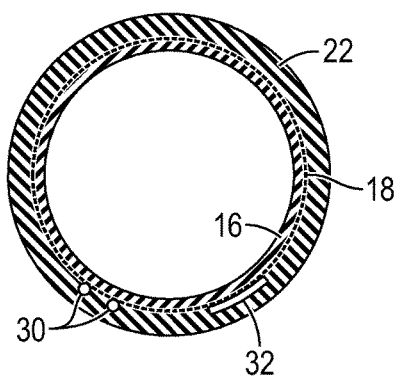
FIG. 4B shows an end view of the embedded elastomeric element.

FIG. 4A shows an embedded reinforcing layer according to embodiments of the present disclosure. FIG. 4B shows an end view of the embedded elastomeric element. The reinforcing layer 18 has cables 30 extending from top to bottom of the reinforcing layer. The cables 30 can be electrical communication lines, hydraulic lines, or any other suitable communication line. An instrument 32 can also be implanted into the reinforcing layer 18. The cables 30 and/or instrument 32 can be woven into the reinforcing layer 18, bonded to one side of the reinforcing layer 18, or otherwise superimposed adjacent the reinforcing layer 18.

Figure 5:
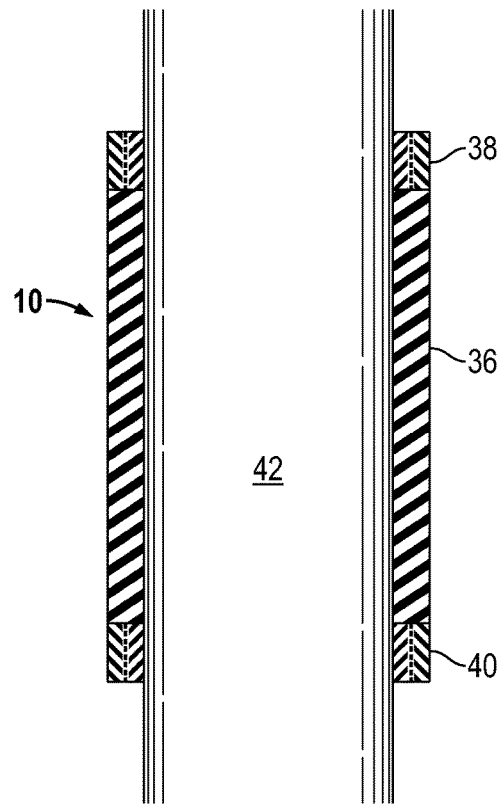
FIG. 5 shows a cross-sectional view of a mandrel and elastomeric element having a reinforced section according to embodiments of the present disclosure.

FIG. 5 shows a cross-sectional view of a mandrel 42 and elastomeric element 10 having reinforced end portions 38 and 40 according to embodiments of the present disclosure. The mandrel 42 is the support structure for the elastomeric element 10 and is shown here in a simplified form. The mandrel 42 can have additional features and shapes that are not shown in FIG. 5. The end portions 38 and 40 of the elastomeric element 10 are reinforced with a layer of reinforcing material as disclosed herein. The mid portion 36 can be reinforced as the end portions 38 and 40 are, it can be made without reinforcement, or it can be made with a reinforcement different from that of the end portions 38 and 40. The end portions 38 and 40 can be reinforced differently. In many applications there is a pressure differential above and below the packer. The high pressure side can be above or below the packer. For purposes of explanation the lower side of this packer is the high-pressure side. The end portion 40 nearer the high-pressure side can be reinforced with a stronger material than the low-pressure side. The mid portion 36 can be reinforced more strongly near the high-pressure side to mitigate extrusion and other deformation caused by the pressure.

In the specification and appended claims: the terms "connect", "connection", "connected", "in connection with", and "connecting" are used to mean "in direct connection with" or "in connection with via one or more elements"; and the term "set" is used to mean "one element" or "more than one element". Further, the terms "couple", "coupling", "coupled", "coupled together", and "coupled with" are used to mean "directly coupled together" or "coupled together via one or more elements". As used herein, the terms "up" and "down", "upper" and "lower", "upwardly" and "downwardly", "upstream" and "downstream"; "above" and "below"; and other like terms indicating relative positions above or below a given point or element are used in this description to more clearly describe some embodiments of the disclosure.

While the present disclosure has been disclosed with respect to a limited number of embodiments, those skilled in the art, having the benefit of this disclosure, will appreciate numerous modifications and variations there from. It is intended that the appended claims cover such modifications and variations as fall within the true spirit and scope of the invention.

What is claimed is:

1. An elastomeric element for a packer, comprising:
   a base layer made of an elastomeric material;
   a reinforcing layer comprising a fabric material having reinforcing fibers, the reinforcing layer being superimposed upon the base layer;
   a top layer made of an elastomeric material superimposed upon the reinforcing layer and bonded to the base layer through the reinforcing layer; and
   an instrument between the base layer and the top layer, the instrument being bonded to one side of the reinforcing layer.

2. The elastomeric element of claim 1 wherein the reinforcing fibers comprise at least one of Kevlar, steel, or Polyimide fibers.

3. The elastomeric element of claim 1 wherein the top layer and reinforcing layer are of similar thickness and the base layer is thicker than the top layer and the reinforcing layer.

4. The elastomeric element of claim 1 wherein the elastomeric element has an anti-extrusion region at an axial end of the element, and wherein the reinforcing layer covers the anti-extrusion region.

5. The elastomeric element of claim 1 wherein the instrument comprises at least one of a strain gauge, temperature sensor, pressure sensor, or chemical sensor.

6. The elastomeric element of claim 1, further comprising a communication conduit between the top layer and the base layer, wherein the communication conduit is configured to communicate through at least a portion of the packer.

7. The elastomeric element of claim 6 wherein the communication conduit comprises at least one of an electrical conduit or a hydraulic conduit.

8. The elastomeric element of claim 1, further comprising a packer and a mandrel.

9. A method of manufacturing an elastomeric element for a packer, the method comprising:
   forming a base layer of elastomeric material, the base layer having an outer surface, wherein the elastomeric material is configured to be deformed under pressure to set the packer in a well;
   disposing a reinforcing layer over a portion of the outer surface of the base layer, wherein the reinforcing layer has higher mechanical strength than the base layer, and wherein the reinforcing layer comprises a fibrous layer;
   positioning a top layer over the reinforcing layer;
   embedding an instrument between the base layer and the top layer such that the instrument is bonded to one side of the reinforcing layer; and
   bonding the base layer, reinforcing layer, and top layer together.

10. The method of claim 9 wherein the fibrous layer of the reinforcing layer is made of at least one of Kevlar, steel, or Polyamide.

11. The method of claim 9 wherein the elastomeric element has a top end and a bottom end, and wherein disposing the reinforcing layer comprises covering at least a portion of the top end and bottom end.

12. The method of claim 9 wherein disposing the reinforcing layer comprises disposing a first reinforcing layer over a first portion of the base layer, the method further comprising disposing a second reinforcing layer over a second portion of the base layer, wherein the first and second reinforcing layers have different mechanical properties.

13. The method of claim 9 wherein the base layer and top layer are formed of identical materials.

14. The method of claim 9 wherein disposing the reinforcing layer and positioning a top layer over the reinforcing layer comprise calendaring the base layer, reinforcing layer, and top layer together.

15. The method of claim 9, further comprising embedding a communication conduit through the elastomeric element.

16. A method of manufacturing a packer, comprising:
   coating a reinforced fabric material with a first elastomeric compound to form a coated reinforced fabric layer;

forming a base layer for an elastomeric packer element of a second elastomeric compound, wherein the first elastomeric compound is configured to bond with the second elastomeric compound;

shaping the base layer into a cylindrical shape suitable for the packer;

mounting the base layer to a mandrel;

wrapping the coated reinforced fabric layer around the base layer such that the reinforced fabric layer bonds with the base layer; and bonding an instrument to one side of the coated reinforced fabric layer.

17. The method of claim 16, further comprising embedding a communication line into the reinforced fabric material.

18. The method of claim 17 wherein the communication line comprises at least one of an electrical line and a hydraulic line.

* * * * *